(12) United States Patent
Gong et al.

(10) Patent No.: US 7,849,216 B2
(45) Date of Patent: Dec. 7, 2010

(54) CHANNEL ASSIGNMENT FOR A MULTI-CHANNEL DUAL-RADIO MESH BACKHAUL

(75) Inventors: Xiaohong Gong, Sunnyvale, CA (US); David S. Stephenson, San Jose, CA (US); Johannes P. Kruys, Harmelen (NL); Bretton Lee Douglas, Bloomington, IL (US)

(73) Assignee: Cisco Technology, Inc., San Jose, CA (US)

( * ) Notice: Subject to any disclaimer, the term of this patent is extended or adjusted under 35 U.S.C. 154(b) by 422 days.

(21) Appl. No.: 11/931,950

(22) Filed: Oct. 31, 2007

(65) Prior Publication Data

US 2009/0109855 A1    Apr. 30, 2009

(51) Int. Cl.
*G06F 15/173* (2006.01)

(52) U.S. Cl. .................. 709/244; 709/239; 709/240; 709/241; 709/242; 709/243

(58) Field of Classification Search .................. 709/244
See application file for complete search history.

(56) References Cited

U.S. PATENT DOCUMENTS

| 2004/0171401 A1* | 9/2004 | Balachandran et al. ...... 455/522 |
| 2006/0230150 A1* | 10/2006 | Roy ........................... 709/226 |
| 2008/0151821 A1* | 6/2008 | Cho et al. ................... 370/329 |
| 2008/0259891 A1* | 10/2008 | Dent .......................... 370/342 |

* cited by examiner

*Primary Examiner*—Jeffrey Pwu
*Assistant Examiner*—Abdelnabi O Musa
(74) *Attorney, Agent, or Firm*—Tucker Ellis & West LLP (57) ABSTRACT

In an example embodiment, a method for determining backhaul channel assignments for multi-channel dual radio mesh nodes. The method comprises acquiring collision domain data for each access point of an associated mesh network. A cost function is calculated for each access point of the associated mesh network, the cost function assigning a weighted value for each access point in a collision domain based on a number of access points in the collision domain. Backhaul channel assignments for selected for each access point that minimizes the cost function.

18 Claims, 3 Drawing Sheets

CHANNEL ASSIGNMENT FOR A MULTI-CHANNEL DUAL-RADIO MESH BACKHAUL

TECHNICAL FIELD

This application is generally directed to Mesh Networking.

BACKGROUND

In a multi-hop wireless mesh network, throughput decreases approximately between linearly and exponentially with an increase in hop count, due to interference generated by neighboring mesh Access Points (MAPs) on the same channel. The end-to-end throughput available to each node in the same network can be represented by $$O\left(\frac{1}{\sqrt{n}}\right),$$

where n is the number of nodes in the network. Further, due to contention from subsequent forwarding nodes, the end-to-end throughput that a daisy-chained network can achieve is approximately 1/7 of the available capacity.

Unlike cellular networks or Wireless Local Area Networks (WLANs), wireless mesh networks have unique characteristics, such as self-healing, self-forming, multi-hop forwarding, and traffic aggregation at every downstream Access Point (AP). Existing solutions often assume a flat mesh topology and assign channels dynamically in a distributed fashion over a short period of time, incurring large channel switching overhead and high complexity. Some vendors have multi-radio and multi-channel backhaul products; however, a static channel assignment algorithm is often utilized, where channels are determined when the network is setup and manually configured at each mesh AP.

OVERVIEW OF EXAMPLE EMBODIMENTS

The following presents a simplified overview of the example embodiments in order to provide a basic understanding of some aspects of the example embodiments. This overview is not an extensive overview of the example embodiments. Its sole purpose is to present some concepts of the example embodiments in a simplified form as a prelude to the more detailed description that is presented later.

In accordance with an example embodiment, there is disclosed herein, an apparatus comprising a transceiver configured to be in data communication with an associated mesh network and channel assignment logic in data communication with the transceiver. The channel assignment logic is operable to assign backhaul channels to each access point of the associated mesh network. The channel assignment acquires collision domain data for each access point of the associated mesh network and assigns a backhaul channel to each access point of the associated mesh network in order to minimize a maximum number of weighted nodes sharing the channel within a collision domain.

In an example embodiment, a method for determining backhaul channel assignments for multi-channel dual radio mesh nodes. The method comprises acquiring collision domain data for each access point of an associated mesh network. A cost function is calculated for each access point of the associated mesh network, the cost function assigning a weighted value for each access point in a collision domain based on a number of access points in the collision domain. Backhaul channel assignments for selected for each access point that minimizes the cost function.

DESCRIPTION OF EXAMPLE EMBODIMENTS

This description provides examples not intended to limit the scope of the claims. The figures generally indicate the features of the examples, where it is understood and appreciated that like reference numerals are used to refer to like elements.

Described in an example embodiment herein is a dynamic channel assignment scheme that considers traffic load, network topology, and interference. Further, an example embodiment described herein utilizes the controller architecture and allows controller to make a centralized decision based on information gathered at each mesh AP.

Many channel assignment problems can be formulated as graph coloring problems with different constraints. A wireless mesh network can be formulated as an undirected graph $G=\{V, E\}$, where V represents the set of mesh nodes and E is the set of edges that represent radio links. If the number of available channels, denoted by $|C|$, is sufficiently large, the channel assignment algorithm should assign distinct channels to any nodes within any collision domain. However, in many cases, depending on the Signal-to-Interference Ratio (SIR) required at the receivers of the backhaul nodes, the number of available channels may be less than the number of nodes in a collision domain and channels have to be carefully assigned to mesh nodes to avoid conflicts as much as possible. In two-radio backhaul systems, all children nodes of the same parent are assigned the same channel.

In a wireless ad hoc network, it is desirable to minimize the number of nodes sharing the same channel with any designated node within this node's collision domain. A collision domain is defined as a node's (k+1)-hop neighborhood, where k is the ratio between the carrier sense range and the communication range. The carrier sense range can be approximately determined by the transmit power, the pathloss, and the receiver sensitivity at the lowest data rate, whereas the communication range is determined by the transmit power, the pathloss, and the receiver sensitivity at the desired data rate. For example, a 24 Mbps or 18 Mbps mesh backhaul operating in a suburban environment, k is approximately 2. Another way to determine the collision domain is to utilize the measurements reported from mesh APs because the RF environment surrounding each AP may be different.

In an example embodiment, to determine each mesh AP's collision domain empirically, 11 k/RRM (Radio Resource Management) exchanges may be used by each mesh node to determine signal strength from all its peers. This data can be shared or sent up to the controller to allow the collision domains to be predicted.

In another example embodiment, the following procedure could be used. A link test is run on any individual link and the maximum throughput is recorded. Then, simultaneous traffic flows are sent on any two links, and the maximum throughput on each link is measured. If the sum of the individual throughput on two links and the combined throughput measured when both links are tested are similar, the two links are not in the same collision domain. Otherwise, the two links are in the same collision domain.

Unlike ad hoc networks that have relative flat topologies, a wireless mesh network has a tree-like topology and traffic aggregates towards the root of the tree. Thus, different constrains and cost functions are needed. In the example embodiments described herein, assume that each node has two backhaul radios although the same approach can be applied to other configurations In an example embodiment, given the characteristics of mesh networks, two additional constraints for channel assignment are employed:

1) Because each node is equipped with two backhaul radios, each node is assigned two unique channels: one is used for the upstream communication with its parent node and the other is used for downstream communication with its children. All children of the same parent share the same upstream channel to avoid the channel switching overhead at the parent node.

2) Traffic aggregates in mesh networks. The closer a node is to the root AP (RAP), the heavier the traffic becomes. Thus, the nodes with lower hop counts are given higher priority than the nodes with higher hop counts when getting channels.

In an example embodiment described herein, a goal is to minimize the maximum number of weighted nodes sharing the same channel within the same collision domain, for example:

$$\text{Minimize over } c_j \in C: \max \sum_{i=1}^{N_j} w_i$$

where $N_j$ is the number of nodes in the same collision domain that utilize the same channel $c_j \epsilon C$ to communicate with its parent. $w_i$ is the weight assigned to the ith node and it is calculated as the count of the number of nodes on the subtree rooted at the ith node. $w_i$ is also defined to take the traffic aggregation factor into consideration.

In an example embodiment, to ensure fast routing convergence at initial installation and to facilitate fast recovery from major disruptions, initially all mesh APs including RAP are on the same (bootstrap) channel. The bootstrap channel may be programmed into all nodes before shipping. Alternatively, the bootstrap channel can be determined locally by having the RAP select one channel and allowing the MAPs to find it.

In an example embodiment, the channel assignment algorithm is a centralized algorithm that leverages the knowledge of the routing tree structure and operates at the controller rather than in each node. During the building of the routing tree, MAPs and the RAP report their parents, children, and one-hop neighbor lists back to the controller so that the controller can compile a topology of the mesh network. Note that the controller knows when the routing tree has been formed (e.g. all or most nodes have registered with the controller).

The following is an algorithm in accordance with an example embodiment:

1) The controller first assigns two channels to the RAP. The RAP will use both channels to communicate with its children since it has no parent to transmit to. The RAP divides its children in two sets based on the minimization of the cost function and selects one channel for one set and selects another channel for the other set.

2) The controller examines the nth hop MAPs and assigns channels to the children of the nth hop MAPs. Note that the cost function needs to be minimized at every step subject to the first constraint that the children of the same MAP need to be on the same channel. Further, all nth hop MAPs in the same collision domain, i.e. within (k+1)-hop of each other, need to be considered at each step.

3) This repeats for n=2, 3, . . . , until each MAP is assigned a channel for upstream transmission.

4) After the controller assigns the available channels to the mesh nodes, it instructs the mesh nodes to switch to their assigned channels.

5) In order not to obstruct the normal operation of the whole mesh network, the channel switching procedure is performed from the bottom up. It starts from the leaf nodes and stops after all nodes have switched to their designated channels.

After the network is in operation, channels can be assigned based on the traffic load on each mesh AP and the percentage of the medium shared with external networks. Therefore, in an example embodiment, a goal is to minimize the following cost function:

$$\text{Minimize over } c_j \in C: \max\left( U\left(\sum_{i=1}^{E_j} u_i\right) + \sum_{i=1}^{N_j} m_i \right)$$

Subject to: $P(\text{noise\_floor} > T_f) < P_f$ where $N_j$ is the number of nodes in the same collision domain that utilize the same channel $c_j \epsilon C$ to communicate with its parent and $E_j$ is the number of external interferers on channel $c_j$. $m_i$ is the percentage of medium utilization on channel $c_j$ by the ith node for transmitting packets and $$U\left(\sum_{i=1}^{E_j} u_i\right)$$

is the cost of medium utilization level on channel $c_j$ by external interferers. Both $m_i$ and $u_i$ are measured by the ith node periodically according to a pre-defined interval. A table look-up can be implemented to map the percentage of medium busy to the medium utilization level. The mapping between the percentage of medium busy and the medium utilization level can be a direct mapping, such as $$U\left(\sum_{i=1}^{E_j} u_i\right) = \sum_{i=1}^{E_j} u_i.$$

Or U can be adjusted based on the hop count, for example:

| Percentage of medium utilized by external interferers | Cost of medium utilization level (U) |
|---|---|
| >60% | 1/(1 + hop_count) |
| 60% to 40% | 0.6/(1 + hop_count) |
| 40% to 20% | 0.4/(1 + hop_count) |
| <20% | 0.2/(1 + hop_count) |

The hop count is considered to ensure that channels chosen by RAP and/or the $1^{st}$-hop MAPs have minimum external interference. The measured noise floor is used as a constraint. If the measured noise floor for channel $c_j$ is over a pre-defined threshold, i.e. $T_f$, over a pre-defined percentage of time, the channel $c_j$ is not considered for channel assignment at this AP. This is because even when CCA is not triggered, the noise floor can still be elevated by adjacent channel interference and non-WiFi co-channel interference, which adversely affects the mesh throughput. The elevated noise floor can even cause excessive packet losses since rate shifting can be disabled over the mesh backhaul.

Channel assignment can also be combined with load balancing to further improve network capacity. For instance, if a node experiences frequent buffer overflows due to high ingress traffic, this node can be either assigned a channel with fewer contending nodes or some of its children can be moved to different parents by getting different channels from the current parent node.

Figure 1:
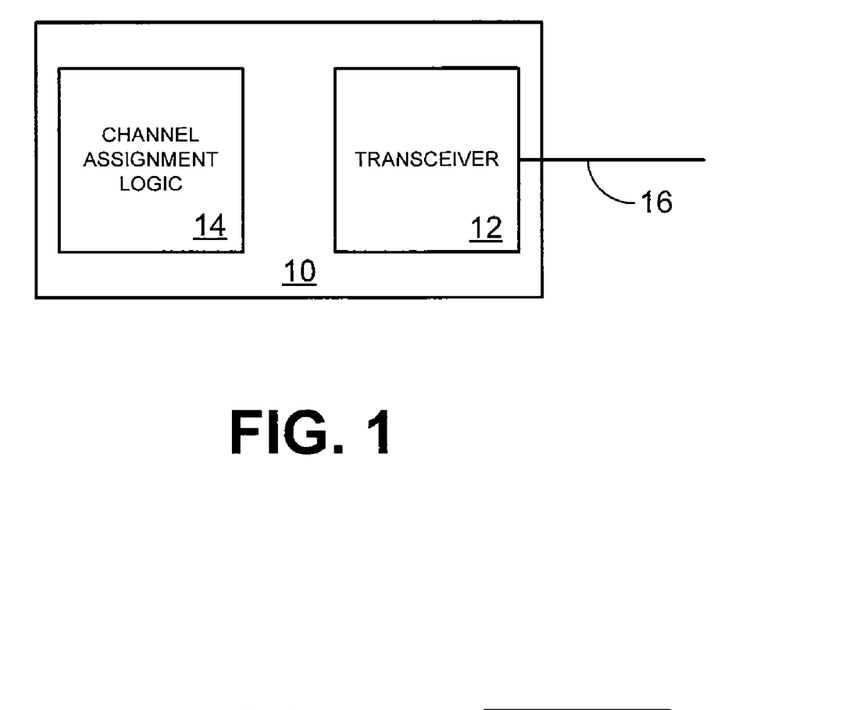
FIG. 1 illustrates an example embodiment of an apparatus configured to perform channel assignment for a multi-channel dual-radio mesh backhaul.

FIG. 1 illustrates an example of an apparatus 10 configured to implement an example embodiment. Apparatus 10 comprises a transceiver 12 configured to be in data communication with an associated mesh network and channel assignment logic in data communication with the transceiver. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Transceiver 12 is in data communication with an associated mesh network via link 16. Link 16 is suitably any wired or wireless data path suitable for acquiring data from the associated mesh network. In operation, transceiver 12 can acquire data from the associated mesh network that channel assignment logic employs to determine channel assignments. Transceiver 12 is operable to send channel assignments to the access points.

Figure 2:
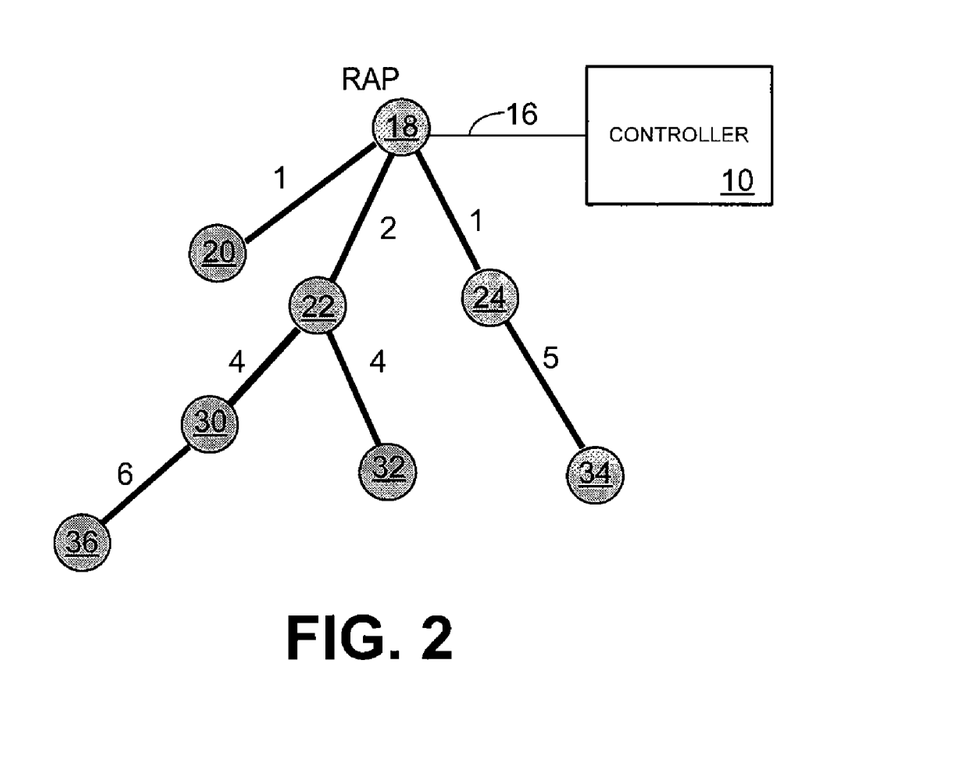
FIG. 2 is an example of a mesh network employing a controller to perform channel assignment for a multi-channel dual-radio mesh backhaul.

Referring to FIG. 2, with continued reference to FIG. 1, there is illustrated an example embodiment of a mesh network employing apparatus 10 as a controller. In the illustrated embodiment, apparatus 10 is coupled to root access point 18; however, those skilled in the art should readily appreciate that in other embodiments apparatus 10 can be co-located with root access point 18 or located anywhere within the network.

Root access point 18 is coupled to three first hop nodes, access points 20, 22, 24. The second hop of the network comprises access points 30 and 32 coupled to access point 22 and access point 34 coupled to access point 24. A third hop comprises access point 36 that is coupled to access point 30.

Channel assignment logic 14 in controller 10 is operable to assign backhaul channels to each access point 18, 20, 22, 24, 30, 32, 34 and 36 of the associated mesh network. Channel assignment logic 14 is configured to acquire collision domain data via transceiver 12 for each access point 18, 20, 22, 24, 30, 32, 34 and 36 of the associated mesh network.

As will be described in further detail herein, channel assignment logic 14 is configured to assign a backhaul channel to each access point 18, 20, 22, 24, 30, 32, 34, 36 of the associated mesh network in order to minimize a maximum number of weighted nodes sharing the channel within a collision domain.

In the example embodiment illustrated in FIG. 2, each access point 18, 20, 22, 24, 30, 32, 34, 36 has two backhaul radios (not shown). Root access point 18 uses both radios for downlink communications, since there are no uplink nodes from root access point 18. Mesh access points 20, 22, 24, 30, 32, 34, 36 below root access point 18 employ one backhaul radio for uplink communications (linked to a parent node with a lower hop count) and one backhaul radio for downlink communications (linked to one or more child access points having a higher hop count). For example, mesh access point 22 employs channel 2 as an uplink channel to communicate with root access point 18 and employs channel 4 as a downlink channel to communicate with child access points 30, 32.

At initialization, or at predetermined times or events such as new mesh access points being detected or a mesh access point is no longer available, controller 10 acquires data about the topology of the network. For example controller 10 can request a list comprising a parent access point, children access point and a one-hop neighbor list from each access point 18, 20, 22, 24, 30, 32, 34, 36. Channel assignment logic 14 can generate a topology of the mesh network.

Channel assignment logic 14 also acquires data representative of the collision domain for each of access points 18, 20, 22, 24, 30, 32, 34, 36. Any suitable means for determining the collision domain of access points can be employed. For example, each access point may perform 11K/RRM exchanges enabling the other access points to determine signal strengths. Controller 10 can use the signal strength data o predict collision domains with adequate accuracy. As another example, a link test run can be run on any individual link and the maximum throughput of the individual link test can be recorded. Then simultaneous flows can be sent on two links and the combined throughputs of the individual links can be compared to the combined throughput. Alternatively, simultaneous flows can be sent on two links and the throughput of the first link with simultaneous flows can be compared with the throughput of the individual flow to determine whether throughput was affected by the additional flow.

After the collision domains have been determined, channel assignment logic 14 determines channel assignments for access points 18, 20, 22, 24, 30, 32, 34, 36. Channel assignment logic 14 assigns a weighted value for each channel in the collision domain and attempts to minimize the sum of the weighted nodes sharing the same channel within the same collision domain. This can be represented as:

$$\text{Minimize over } c_j \in C: \max \sum_{i=1}^{N_j} w_i$$

where $N_j$ is the number of nodes in the same collision domain that utilize the same channel $c_j \epsilon C$ to communicate with its parent. $w_i$ is the weight assigned to the ith node and it is calculated as the count of the number of nodes on the subtree rooted at the ith node. $w_i$ is so defined to take the traffic aggregation factor into consideration.

Controller 10 initially assigns two downlink channels for root access point 18 (e.g. channels 1 and 2). Controller 10 then assigns uplink channels for access points 20, 22, 24 to correspond to one of the downlink channels of root access point 18. Controller 10 then employs the cost function and assigns downlink channels for the first hop access points, access points 20, 22, 24. This procedure continues until all hops have been assigned backhaul channels. For example, after first hop access points have been assigned channels (e.g. access point 20 has no child access points so it is not assigned a channel, access point 22 is assigned channel 4 and access point 24 is assigned channel 5), the next hop access points, access points 30, 32 and 34 are assigned channels, and then the final hop access point 36.

In an example embodiment, access points initialize on a predetermined (e.g. bootstrap) channel. This enables controller 10 to communicate with the access points to acquire data and send channel assignments. In another example embodiment, root access point 18 can select one channel for communicating with the other access points. The other access points will scan channels until they locate root access point 18.

Each access point is provided with its channel assignments (uplink and downlink). Controller 10 can instruct the access points when to switch to their assigned channels. In an example embodiment, channels are switched starting at the highest hop (e.g. access point 36) and proceeding to the lowest hop until root access point 18 is reached.

Once the network is operated, channel assignments can be adjusted based on external interference and/or traffic loading. For example, channel assignment logic 14 can be configured to minimize the following cost function:

$$\text{Minimize over } c_j \in C: \max\left( U\left(\sum_{i=1}^{E_j} u_i\right) + \sum_{i=1}^{N_j} m_i \right)$$

Subject to: $P(\text{noise\_floor} > T_f) < P_f$ where $N_j$ is the number of nodes in the same collision domain that utilize the same channel $c_j \in C$ to communicate with its parent and $E_j$ is the number of external interferers on channel $c_j$. $m_i$ is the percentage of medium utilization on channel $c_j$ by the ith node for transmitting packets and $$U\left(\sum_{i=1}^{E_j} u_i\right)$$

is the cost of medium utilization level on channel $c_j$ by external interferers. Both $m_i$ and $u_i$ are measured by the ith node periodically according to a pre-defined interval. A table lookup can be implemented to map the percentage of medium busy to the medium utilization level. The mapping between the percentage of medium busy and the medium utilization level can be a direct mapping, such as $$U\left(\sum_{i=1}^{E_j} u_i\right) = \sum_{i=1}^{E_j} u_i.$$

Or U can be adjusted based on the hop count, for example:

| Percentage of medium utilized by external interferers | Cost of medium utilization level (U) |
|---|---|
| >60% | 1/(1 + hop_count) |
| 60% to 40% | 0.6/(1 + hop_count) |
| 40% to 20% | 0.4/(1 + hop_count) |
| <20% | 0.2/(1 + hop_count) |

The hop count can be considered to ensure that channels chosen by RAP and/or the $1^{st}$-hop MAPs have minimum external interference.

In an example embodiment, the measured noise floor can be used as a constraint. If the measured noise floor for channel $c_j$ is over a pre-defined threshold, i.e. $T_f$, over a pre-defined percentage of time, the channel $c_j$ is not considered for channel assignment at this AP. This is because even when CCA is not triggered, the noise floor can still be elevated by adjacent channel interference and non-WiFi co-channel interference, which adversely affects the mesh throughput. The elevated noise floor can even cause excessive packet losses since rate shifting is disabled over the mesh backhaul.

Channel assignment can also be combined with load balancing to further improve network capacity. For instance, if a node experiences frequent buffer overflows due to high ingress traffic, this node can be either assigned a channel with fewer contending nodes or some of its children can be moved to different parents by getting different channels from the current parent node.

Figure 3:
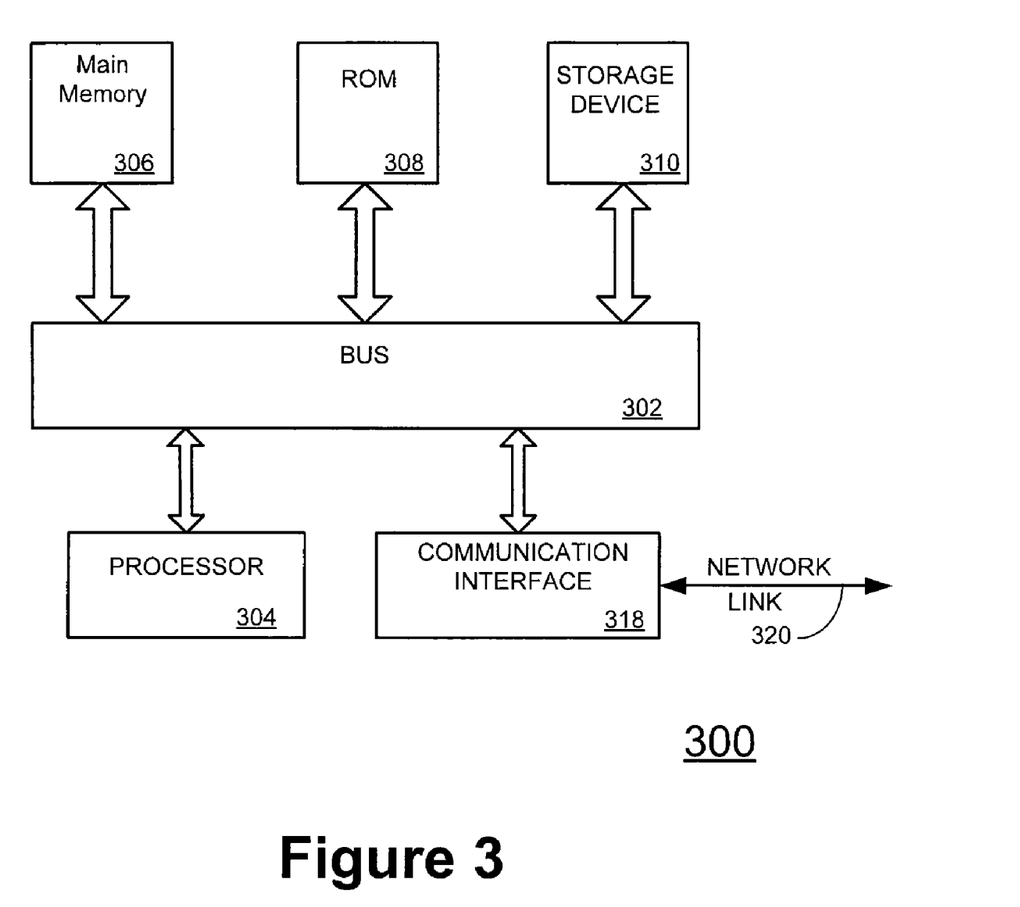
FIG. 3 illustrates a computer system configured to implement an example embodiment.

FIG. 3 is a block diagram that illustrates a computer system 300 upon which an example embodiment may be implemented. For example, computer system 300 can be employed to implement channel assignment logic 14 in FIG. 1. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for channel assignment for a multi-channel dual radio mesh backhaul. According to an example embodiment, channel assignment for a multi-channel dual radio mesh backhaul is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network (not shown), or to a root access point, such as root access point 18 (FIG. 2). For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information. Network link 320 typically provides data communication through one or more networks to other data devices. herein.

Figure 4:
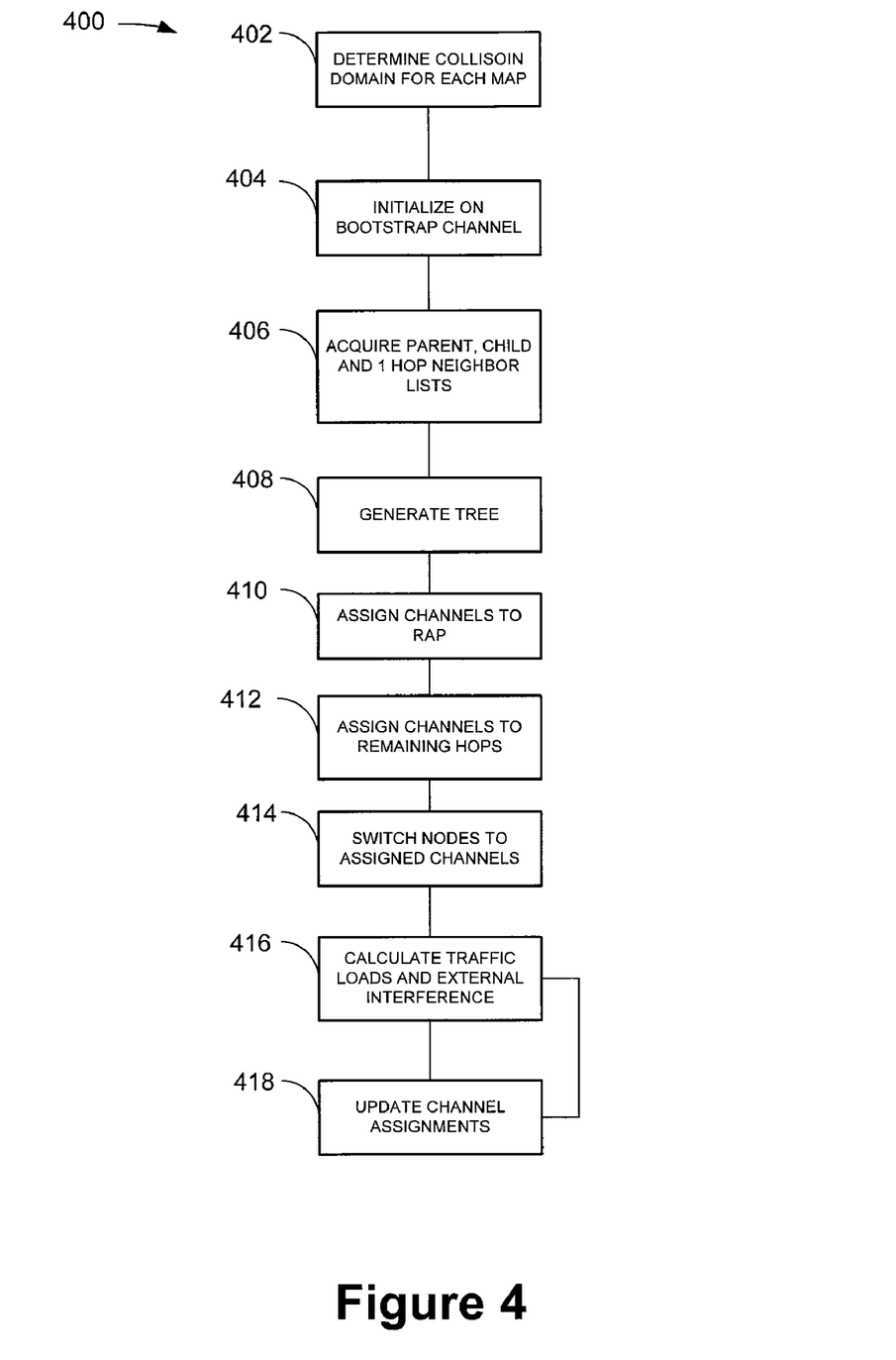
FIG. 4 illustrates an example methodology for performing channel assignment for a multi-channel dual-radio mesh backhaul.

In view of the foregoing structural and functional features described above, a methodology 400 in accordance with an example embodiment will be better appreciated with reference to FIG. 4. While, for purposes of simplicity of explanation, methodology 400 of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. Embodiments of the methodology are suitably adapted to be implemented in hardware, software, or a combination thereof.

At 402, a collision domain is determined for each mesh access point (MAP). The collision domain may be determined by any suitably methodology. For example, each mesh access point may broadcast signals that can be measured by the other mesh access points. The collision domain can be determined based on the measured signal strengths. In an example embodiment, a first link can be established and a maximum throughput of the first link is determined. A second link can be established and a maximum throughput for the second link is established. Subsequently, the first and second links operate concurrently, the sum of the throughputs of the first and second links can be compared to the sum the individual throughputs. If the sum of the throughputs are substantially the same (e.g. within 10-20%), then the two links are not within the same collision domain; however, if the sum of the individual throughputs is higher than the sum of the concurrent throughputs, then the links are within the same collision domain.

At 404, the mesh access points initialize on a bootstrap channel. The bootstrap channel can be a predetermined channel (e.g. can be manually programmed into the mesh APs). Alternatively, the root access point may broadcast a signal allowing the other mesh access points to establish communications.

At 406, parent, child and 1 hop neighbor lists are acquired for each access point. Each access point determines its parent node, any child nodes and 1 hop neighbors and then transmits the list to the device performing channel assignment (e.g. a controller).

At 408, a tree is generated for the mesh network. The tree starts at the root access point (RAP) and encompasses descendant access points.

At 410, two channels are assigned to the Root Access Point (RAP). The channels can be chosen employing a cost function that minimizes the sum of weighted nodes sharing the same channel within the same collision domain. For example, the following cost function can be employed:

$$\text{Minimize over } c_j \in C: \max \sum_{i=1}^{N_j} w_i$$

where $N_j$ is the number of nodes in the same collision domain that utilize the same channel $c_j \epsilon C$ to communicate with its parent. $w_i$ is the weight assigned to the ith node and it is calculated as the count of the number of nodes on the subtree rooted at the ith node. $w_i$ is so defined to take the traffic aggregation factor into consideration.

At 412, channels are assigned to the remaining hops. After the RAP is assigned, channels are assigned for the first hop and then for each hop of increasing value (e.g. 1, 2, . . . n, where n is the number of the last hop). The same cost function algorithm described at 410 can be employed for assigning channels to the remaining hops.

At 414, all of the access points are switched to their assigned channels. In an example embodiment, channel switching is performed from the bottom (e.g. the highest hop count) up (lowest hop count or the RAP).

At 416, after the network is in operation, channels can be assigned based on the traffic load one each mesh AP and/or the percentage of the medium shared with external networks (or other external interferers). In an example embodiment, the following cost function can be minimized:

$$\text{Minimize over } c_j \in C: \max\left(U\left(\sum_{i=1}^{E_j} u_i\right) + \sum_{i=1}^{N_j} m_i\right)$$

$$\text{Subject to: } P(\text{noise\_floor} > T_f) < P_f$$

where $N_j$ is the number of nodes in the same collision domain that utilize the same channel $c_j \in C$ to communicate with its parent and $E_j$ is the number of external interferers on channel $c_j$. $m_i$ is the percentage of medium utilization on channel $c_j$ by the ith node for transmitting packets and $$U\left(\sum_{i=1}^{E_j} u_i\right)$$

is the cost of medium utilization level on channel $c_j$ by external interferers. Both $m_i$ and $u_i$ are measured by the ith node periodically according to a pre-defined interval. A table look-up can be implemented to map the percentage of medium busy to the medium utilization level. The mapping between the percentage of medium busy and the medium utilization level can be a direct mapping, such as $$U\left(\sum_{i=1}^{E_j} u_i\right) = \sum_{i=1}^{E_j} u_i.$$

Or U can be adjusted based on the hop count:

| Percentage of medium utilized by external interferers | Cost of medium utilization level (U) |
|---|---|
| >60% | 1/(1 + hop_count) |
| 60% to 40% | 0.6/(1 + hop_count) |
| 40% to 20% | 0.4/(1 + hop_count) |
| <20% | 0.2/(1 + hop_count) |

The hop count is considered to ensure that channels chosen by RAP and/or the $1^{st}$-hop MAPs have minimum external interference.

The measured noise floor is used as a constraint. If the measured noise floor for channel $c_j$ is over a pre-defined threshold, i.e. $T_f$, over a pre-defined percentage of time, the channel $c_j$ is not considered for channel assignment at this AP. This is because even when CCA is not triggered, the noise floor can still be elevated by adjacent channel interference and non-WiFi co-channel interference, which adversely affects the mesh throughput. The elevated noise floor can even cause excessive packet losses since rate shifting is disabled over the mesh backhaul.

Channel assignment can also be combined with load balancing to further improve network capacity. For instance, if a node experiences frequent buffer overflows due to high ingress traffic, this node can be either assigned a channel with fewer contending nodes or some of its children can be moved to different parents by getting different channels from the current parent node. At 418, the channel assignments are adjusted. The cost function can be calculated and channel adjustments implemented at predetermined intervals are whenever certain events occurs such as a new mesh AP is added to the network or communication with a mesh AP is lost.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
 a transceiver configured to be in data communication with an associated mesh network; and
 channel assignment logic in data communication with the transceiver, the channel assignment logic is operable to assign backhaul channels to each access point of the associated mesh network, wherein each access point comprises at least two transceivers for communicating on at least two channels respectively;
 wherein the channel assignment logic is configured to acquire collision domain data for each access point of the associated mesh network wherein the collision domain is defined as a node's (k+1)-hop neighborhood, where k is the ratio between the carrier sense range and the communication range
 wherein the channel assignment logic is configured to assign a backhaul channel to each access point of the associated mesh network in order to minimize a maximum number of weighted nodes sharing the channel within a collision domain;
 wherein the channel assignment logic assigns at least a first downlink channel and a second downlink channel to a root access point;
 wherein the channel assignment logic assigns an uplink channel for a first one hop access point to the first downlink channel of the root access point, and further assigns a separate first downlink channel to the first one hop access point, wherein all child access points for the first one hop access point are assigned an uplink channel corresponding to the downlink channel of the first one hop access point; and
 wherein the channel assignment logic assigns an uplink channel for a second one hop access point to the second downlink channel of the root access point, and further assigns a separate downlink channel to the second one hop access point, wherein all child access points for the second one hop access point are assigned an uplink channel corresponding to the downlink channel of the second one hop access point.

2. The apparatus of claim 1, wherein a weighted value for a weighted node is based on a number of sub-tree nodes rooted at the weighted node.

3. The apparatus of claim 1, further comprising:
the channel assignment logic is configured to acquire parent, children and a one-hop neighbor list for each access point of the associated mesh network; and
the channel assignment logic is configured to generate a topology of the mesh network.

4. The apparatus of claim 1, wherein the channel assignment logic is configured to acquire collision domain data by instructing each access point to transmit a signal and acquiring received signal strength data from access points receiving the signal.

5. The apparatus of claim 1, wherein the channel domain logic is
configured to acquire collision domain data by performing an individual link test on a first link and acquiring a maximum throughput;
wherein the channel domain logic is further configured to perform a multiple link test on the first link and a second link and determining a maximum throughput for the first link while testing the second link; and
wherein the channel domain logic is further configured to determine the second link is within the collision domain of the first link responsive to determining the maximum throughput for the multiple link test is lower than the maximum throughput for the individual link test.

6. The apparatus of claim 1, wherein the access points on the associated network initialize to a predetermined channel; and
the channel assignment logic is further configured to signal the access points to switch to their assigned channels.

7. The apparatus of claim 1, further comprising:
the channel assignment logic is configured to acquire data representative of external interference for each access point of the associated network; and
the channel assignment logic is configured to adjust channel assignments based on external interference.

8. The apparatus of claim 7, wherein the channel assignment logic is further configured to adjust the external interference data based on hop count so that access points with lower hop counts are assigned channels with lower interference.

9. The apparatus of claim 7, further comprising:
the channel assignment logic is configured to acquire data representative of media utilization for each access point of the associated network; and
the channel assignment logic is configured to adjust channel assignments based on media utilization.

10. The apparatus of claim 1, further comprising:
the channel assignment logic is configured to acquire data representative of external interference for each access point of the associated network;
the channel assignment logic is configured to acquire data representative of media utilization for each access point of the associated network; and
the channel assignment logic is configured to adjust channel assignments to minimize the sum of external interference and media utilization for each channel.

11. The apparatus of claim 1, wherein the channel assignment logic is further configured to acquire data representative of a noise floor for each channel, wherein the channel assignment logic is configured to not assign a channel to an access point responsive to the noise floor being above a predetermined level for a predetermined amount of time.

12. A method, comprising:
acquiring collision domain data for each access point of an associated mesh network wherein each access point is configured with at least first and second wireless transceivers for communicating on first and second channels respectively wherein the collision domain is defined as a node's (k+1)-hop neighborhood, where k is the ratio between the carrier sense range and the communication range
calculating a cost function for each access point of the associated mesh network, the cost function assigning a weighted value for each access point in a collision domain based on a number of access points in the collision domain; and
selecting channel assignments for each access point that minimizes the cost function wherein selecting channel assignments for each access point comprises assigning at least a first downlink channel and a second downlink channel to a root access point;
wherein selecting channel assignments for each access point further comprises assigning an uplink channel for a first one hop access point to the first downlink channel of the root access point, and assigning a separate first downlink channel to the first one hop access point;
wherein the selecting channel assignments for each access point further comprises assigning an uplink channel for a second one hop access point to the second downlink channel of the root access point and assigning a separate downlink channel to the second one hop access point
wherein selecting channel assignments for each access point further comprises assigning, all child access points of the first one hop access point an uplink channel corresponding to the, downlink channel of the first one hop access point; and
wherein selecting channel assignments for each access point further comprises assigning, all child access points for the second one hop access point an uplink channel corresponding to the downlink channel of the second one hop access point.

13. The method of claim 12, wherein the weighting value is based on a number of sub-tree nodes rooted at the weighted node.

14. The method of claim 12, the selecting channel assignments further comprises:
selecting two downlink channels for the root access point;
selecting an uplink channel for each access point at each hop to match a downlink channel of a parent access point; and
selecting downlink channels for each access point at each hop that minimize the cost function; and
repeating selecting an uplink channel and selecting downlink channels for each hop.

15. The method of claim 12, further comprising:
acquiring data representative of external interference for each access point of the associated mesh network; and
adjusting backhaul channel assignments based on external interference.

16. The method of claim 15, the adjusting backhaul channel assignments further comprises assigning a priority value inverse to hop count.

17. The method of claim 12, further comprising:
acquiring data representative of media utilization for each access point of the associated mesh network; and adjusting channel assignments based on media utilization for each access point.

18. The method of claim 12, further comprising:
acquiring data representative of external interference for each access point of the associated mesh network;
acquiring data representative of media utilization for each access point of the associated mesh network; and
calculating a second cost function, the second cost function comprising a sum of external interference and a sum of media utilization for each channel; and
adjusting channel assignments to minimize the second cost function.

* * * * *